United States Patent [19]

Grant

[11] 4,354,644
[45] Oct. 19, 1982

[54] REEL MOUNTING METHODS AND APPARATUS

[75] Inventor: Frederic F. Grant, Bellflower, Calif.

[73] Assignee: Bell & Howell Company, Chicago, Ill.

[21] Appl. No.: 170,370

[22] Filed: Jul. 21, 1980

[51] Int. Cl.³ .......................................... B65H 17/02
[52] U.S. Cl. ................................................ 242/68.3
[58] Field of Search ...................... 242/68.3, 68, 68.1, 242/68.2, 71.8, 72.1, 46.2, 46.4; 279/2 R

[56] References Cited

U.S. PATENT DOCUMENTS

| | | | |
|---|---|---|---|
| 1,928,979 | 10/1933 | Levison | 242/46.2 |
| 2,647,701 | 8/1953 | Connard | 242/68 |
| 2,749,133 | 6/1956 | Rich | 279/2 |
| 2,903,200 | 9/1959 | McDougall | 242/68.2 |
| 2,904,278 | 9/1959 | Riemenschneider | 242/72.1 |
| 3,002,705 | 10/1961 | Isbell | 242/68.2 |
| 3,108,757 | 10/1963 | Williams | 242/68.2 |
| 3,124,319 | 3/1964 | Cohen | 242/68.3 |
| 3,140,061 | 7/1964 | Benson | 242/68.1 |
| 3,214,107 | 10/1965 | Atkin | 242/46.4 |
| 3,233,841 | 2/1966 | Neff | 242/68.3 |
| 3,239,159 | 3/1966 | Cohen | 242/71.8 |
| 3,278,132 | 10/1966 | Camras | 242/68.3 |
| 3,463,519 | 8/1969 | Raymond | 287/52.09 |
| 3,510,082 | 5/1970 | Sexton | 242/68.2 |
| 3,712,561 | 1/1973 | Williams | 242/68.3 |
| 3,825,203 | 7/1974 | Kjos | 242/68.3 |
| 4,079,896 | 3/1978 | Mach | 242/72.1 |
| 4,183,475 | 1/1980 | Marfija | 242/68.3 |

*Primary Examiner*—Edward J. McCarthy
*Attorney, Agent, or Firm*—Benoit Law Corporation

[57] ABSTRACT

A hollow-cylindrical member, such as a reel, is releasably retained on a rotatable hub against forces tending to loosen the reel. To this end, a plurality of locking keys are inserted into corresponding axial slots in the reel at the inside thereof. These locking keys are first driven up corresponding ramps on the hub into engagement with the inside of the reel at corresponding slots. After such engagement, and during rotation of the hub and reel, the locking keys are continously biased or further urged into their corresponding slots in order to inhibit any looseness between the releasably retained reel and the rotating hub. By way of example, tape reels of large size and mass may thus be securely retained against strong inertial forces occasioned particularly during rapid reversals of the reel rotation as occurring, for instance, in modern instrumentation tape recording and data processing machines.

65 Claims, 3 Drawing Figures

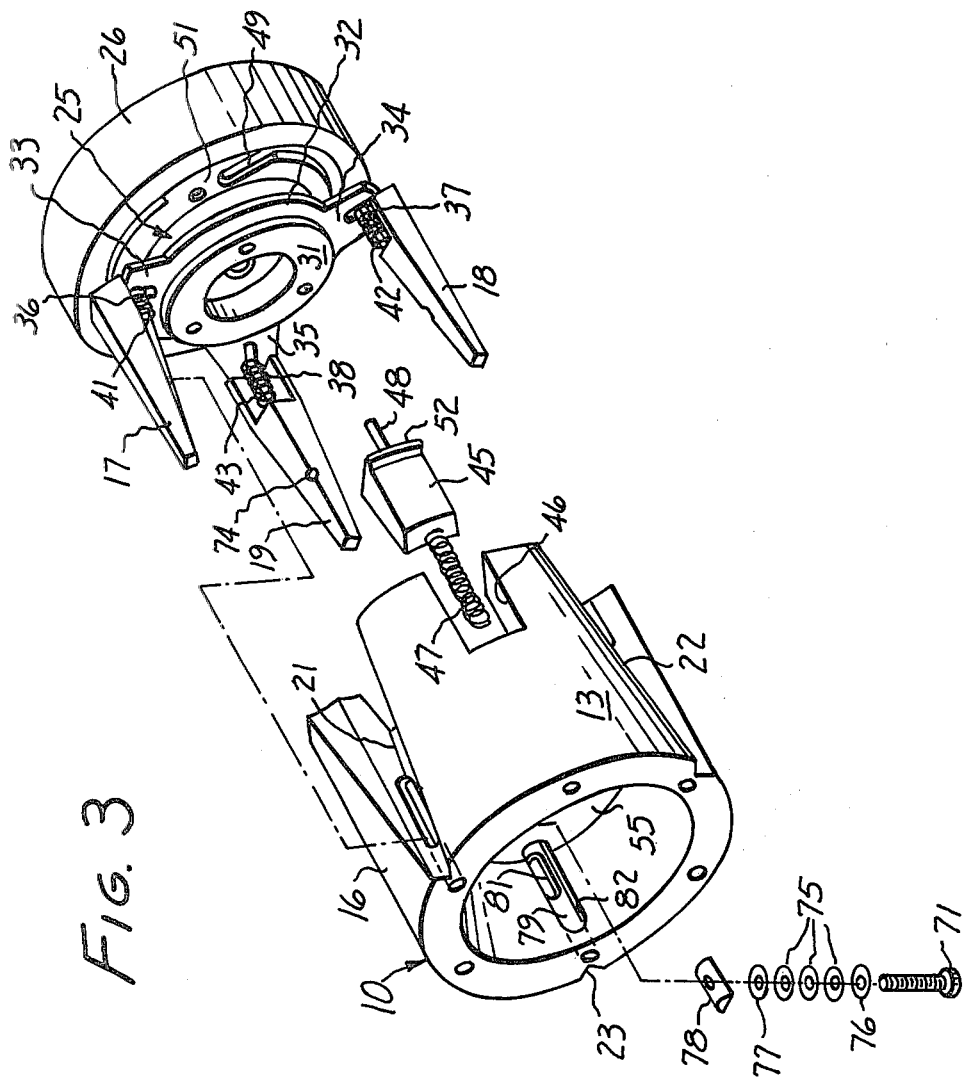

REEL MOUNTING METHODS AND APPARATUS

BACKGROUND OF THE INVENTION

1. Field of the Invention

The subject invention relates to methods, apparatus and systems for mounting a hollow-cylindrical member and, from another aspect thereof, to tape recording methods, apparatus and systems and tape transports. By way of example, the subject invention more specifically relates to apparatus for mounting tape reels for winding and storing magnetic recording tape and other web-like material, herein sometimes generically referred to simply as "tape."

2. Disclosure Statement

The disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Modern instrumentation tape recorders and data processing machines deliver to their tape reels very high torque which is subject to many frequent reversals, as the tape advance is rapidly reversed in such recorders and machines. This subjects tape reels to tremendous, rapidly varying forces which tend to loosen the reel on its mounting hub. Such looseness, in turn, causes pounding of the reel and tape mass on the mounting hub, progressively damaging reel and hub and adversely affecting the tape transport and recording/playback process.

None of the proposals consulted in preparation of the subject disclosure appears to offer any solution to this pressing problem. In particular, U.S. Pat. No. 1,928,979, by R. Levison, issued Oct. 3, 1933, provides a spool and spool holder for threads in which spool retention blades are biased radially by rubber bands and extend through corresponding slots in the spool, so as to be contacted by the wound material. U.S. Pat. No. 2,529,185, by H. G. Proctor, issued Nov. 7, 1950, employs wedge surfaces for forcing barrel segments in a collapsible takeup spool outwardly, thereby interlocking the barrel segments and a cover plate of the collapsible spool. U.S. Pat. No. 2,647,701, by W. H. Cannard, issued Aug. 4, 1953, discloses an expansible core chuck in which annular members of elastic material are expanded into the hollow-cylindrical inner member of a spool or reel. A spate of other expansible core chuck proposals is apparent from U.S. Pat. No. 2,749,133, by J. C. Rich, issued June 5, 1956, U.S. Pat. No. 2,903,200, by A. E. McDougall et al, issued Sept. 8, 1959, U.S. Pat. No. 3,002,705, by W. D. Isbell, issued Oct. 3, 1961, U.S. Pat. No. 3,108,757, by A. T. Williams et al, issued Oct. 29, 1963, and U.S. Pat. No. 3,510,082, by E. A. Sexton et al, issued May 5, 1970, while U.S. Pat. No. 3,712,561, by J. E. Williams, issued Jan. 23, 1973, proposes the employment of frictional pads which are forced into radial engagement with the inside of a tape reel.

In practice, none of these proposals would adequately retain a reel or spool against high and rapidly reversing torque forces. The same applies to proposals which employ radially expanding fingers or segments for reel or roll retention purposes, as may be apparent from U.S. Pat. No. 2,904,278, by C. C. Riemenschneider, issued Sept. 15, 1959, U.S. Pat. No. 3,214,107, by E. D. Atkin, issued Oct. 26, 1965, U.S. Pat. No. 3,278,132, by M. Camras et al, issued Oct. 11, 1966, U.S. Pat. No. 3,463,519, by J. C. Raymond, issued Aug. 26, 1969, and U.S. Pat. No. 4,079,896, by E. F. Plach, issued Mar. 21, 1978. Reference may also be had to U.S. Pat. No. 3,239,159, by W. D. Cohen, issued Mar. 8, 1966, and disclosing a tape-collecting reel employing resilient members for supposedly easy removal of the reel from its driving connection and of the tape itself from the reel.

The seriousness of the problem to which the invention addresses itself may be seen from the fact that otherwise outstanding reel hub constructions do not as such offer a solution to the subject problem in the sense of the present disclosure. Reference may in this respect be had to U.S. Pat. No. 3,140,061, by W. M. Benson, issued July 7, 1964, and employing inclined wedges for releasably retaining a reel on a rotating hub, U.S. Pat. No. 3,233,841, by J. J. Neff, issued Feb. 8, 1966, and disclosing bidirectionally acting reel hub segments for engaging the inside of a reel core, and U.S. Pat. No. 4,183,475, by H. M. Martija, issued Jan. 15, 1980, and disclosing a chuck for retaining reels of various widths employing an expansible split retention ring which is driven up a ramp on an annular reel hub member.

SUMMARY OF THE INVENTION

It is a broad object of this invention to overcome the disadvantages and satisfy the needs expressed or implicit in the above disclosure statement or in other parts hereof.

It is a germane object of this invention to provide improved methods, apparatus and systems for mounting hollow-cylindrical members, such as cores of tape reels.

It is a related object of this invention to provide improved methods, apparatus and systems for releasably retaining a hollow-cylindrical member on a rotatable hub against forces tending to loosen such member.

It is also an object of this invention to provide improved tape transports performing well under conditions of high torque and frequent torque reversals.

Other objects of the invention will become apparent in the further course of this disclosure.

From a first aspect thereof, the subject invention resides in methods and apparatus for releasably retaining a hollow-cylindrical member on a rotatable hub against forces tending to loosen such member. The invention according to this aspect resides, more specifically, in the provision of a wedge-shaped member for engaging the hollow-cylindrical member on the inside thereof, a ramp on the hub for the wedge-shaped member, and methods or means for driving the wedge-shaped member up the ramp into engagement with the inside of the hollow cylindrical member.

Looseness between the releasably retained hollow-cylindrical member and the hub are inhibited by urging the wedge-shaped member further up the ramp after engagement with the inside of the hollow-cylindrical member and continuously during rotation of the hub.

The sample just given of an aspect of the subject invention is not intended to have any limiting effect on the subject disclosure and its appendant claims, and other aspects of the invention are given in the more conveniently pursuable context of the description of preferred embodiments, without intending any limitation to any specific embodiment or group of embodiments.

BRIEF DESCRIPTION OF THE DRAWINGS

The invention and its various aspects and objects will become more readily apparent from the following detailed description of preferred embodiments thereof, illustrated by way of example in the accompanying drawings, in which like reference numerals designate like or functionally equivalent parts, and in which:

FIG. 3 is an exploded view of essential parts of the reel hub assembly of FIGS. 1 and 2.

DESCRIPTION OF PREFERRED EMBODIMENTS

Figure 1:
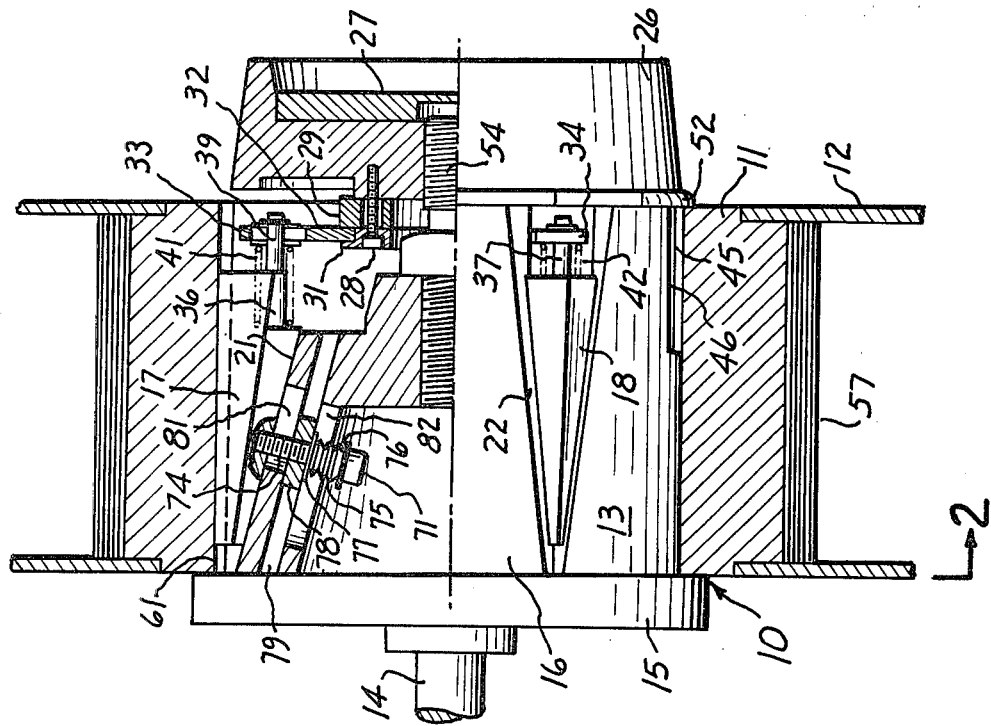
FIG. 1 is a side view, partially in section, of a reel hub assembly with mounted reel, according to a preferred embodiment of the subject invention.

The drawings show a reel hub assembly 10 for releasably retaining a hollow-cylindrical member, such as the core 11 of a tape reel 12 on a rotatable hub 13 against forces tending to loosen the member or core 11, particularly during rapid reversal of the sense of rotation of the reel mounting hub 13.

The hub 13 has a shaft 14 connected to a reel drive which, by way of example, may include a rapidly reversing electric motor with or without transmission gears. Reference may in this respect be had to the above mentioned U.S. Pat. Nos. 3,140,061, 3,233,841 and 4,183,475, herewith incorporated by reference herein. The rotatable drive shaft 14 carries a circular hub mounting plate 15 to which a mounting hub core 16, hereafter sometimes simply referred to as "hub" is attached by screws or other suitable fasteners.

The mounting hub assembly has wedge-shaped members or locking keys 17, 18 and 19 for engaging the hollow-cylindrical core 11 on the inside thereof. The hub 16, in turn, has or is provided with ramps 21, 22 and 23 for the wedge-shaped members 17, 18 and 19, respectively. A rotatable knob assembly 25 is coupled to the wedge-shaped members for driving such members 17 to 19 up the ramps 21 to 23 into engagement with the inside of the hollow-cylindrical core 11. In particular, this actuating assembly 25 may include an externally accessible, manually rotatable knurled knob 26 equipped with a circular frontal trim plate 27.

Fasteners 28, one of which is visible in FIG. 1, attach a retainer ring 29 and a retainer collar 31 to the knob 26 for rotation therewith. A retainer segment plate 32 with retainer segments or lugs 33, 34 and 35 for the reel locking members 17, 18 and 19, respectively, is retained between ring 29 and collar 31.

Each of the locking keys 17, 18 and 19 has a mounting pin 36, 37 or 38 connected to the corresponding retainer segment 33, 34 or 35 via a lost-motion connection 39. Compression springs 41, 42 and 43 normally cause the lost motion couplings 39 to bottom out.

As seen in FIG. 3, a reel hold down clamp 45 may be slidable in a corresponding slot 46 of the hub 16 and may be biased therein by a spring 47. The hold down clamp 45 also carries a frontal pin 48 which, in the assembled condition of the reel hub, enters an angular slot 49 of a cam 51. To avoid undue crowding of the drawing, the cam 51 has not been made visible in FIG. 1. However, such cam may in practice be coupled to the retainer ring 29 or to the knob 26. Preferably, a conventional rotary lost-motion connection is provided so that the cam 51 at its slot 49 causes the frontal pin 48 and thus the hold down clamp 45 to be radially pivoted inwardly, so that the lateral reel nabbing or retention lug 52 clears the outer cylindrical surface of the hub 16. The reel 12 with core 11 may thus be placed on the hub 16. Upon rotation of the knob 26 in a tightening direction, the cam 51 first releases the pin 48 whereby the reel hold down clamp 45 moves radially outwardly, thereby loosely holding the reel 12 on the mounting hub 16. This is broadly shown in FIG. 1 where the slot 46 and reel retention lug 52 are seen at the bottom of the hub assembly, rather than on the side as in FIG. 3.

This is a secondary feature that may be omitted, if desired.

Reverting now to the novel reel locking mechanism according to the subject invention and its illustrated preferred embodiment, the wedge-shaped members or keys 17 to 19 are driven up the ramps 21 to 23 toward the rear plate 15 of the hub and into engagement with the inside of the hollow-cylindrical reel core 11. To this end, the reel hub assembly has an axial threaded bolt 54 mounted on a transverse partition plate 55 of the hub body 16. The actuating knob 26 is threaded on that axial bolt 54, as seen in FIG. 1.

The retainer ring 29 and collar 31 rotate with the knob 26, but the retainer segment plate 32 is slidable therebetween, and is retained against rotation by suitable pins, such as the pins 36 to 38 of the locking keys 17 to 19. Accordingly, the segment plate 32 with retainer segments 33 to 35 moves translatorily or axially of the hub 16, upon rotation of the knob 26. This translatory motion continues, even after the reel hold down clamp 45 has been withdrawn preparatory to an insertion or removal of a tape reel 12, and even after such reel hold down clamp 45 has been expanded to its normal position upon insertion of a reel on the hub 16. To this end, a lost-motion connection, as mentioned above, or a conventional slip coupling may be provided between the reel hold down cam 51 and the knob 26 or retainer ring 29.

A reel 12 having been placed on the hub 16, the knob 26 is rotated until the wedges 17 to 19 have been sufficiently driven up the ramps 21 to 23 for an intimate engagement of the reel core 11.

According to a preferred embodiment of the subject invention, retention of the tape reel 12 against loosening and pounding during the winding of magnetic tape 57 thereon, and during rapid unwinding of tape therefrom, is substantially improved by providing one or more slots 61, 62 and 63 in the hollow-cylindrical reel core 11 at the inside thereof. The members 17 to 19 are then provided as locking keys for engaging the hollow-cylindrical member 11 at the slots 61 to 63, and the hub 16 is provided with ramps 21 to 23 for such locking keys. After the hollow-cylindrical member 11 has been placed onto the hub, the locking keys 17 to 19 are driven up the ramps 21 to 23 into engagement with the hollow cylindrical member 11 at the slots 61 to 63.

In practice, this inhibits looseness from occurring between the reel and its mounting hub. In accordance with a preferred embodiment or of a specific aspect of the subject invention, any looseness between the releasably retained hollow-cylindrical member 11 and the hub 16 is inhibited by urging the wedge-shaped members or locking keys 17 to 19 further up the ramps 21 to 23 after engagement with the inside of the hollow-cylindrical member 11. Such further driving or urging of the locking keys 17 to 19 preferably is continued during rotation of the hub and particularly during rapid reversal of such rotation.

According to the illustrated preferred embodiment, the previously mentioned springs 41 to 43 of the lost-motion couplings 39 may be provided as compression springs coupled to the wedge-shaped locking keys 17 to 19, for biasing such locking keys further up their ramps 21 to 23. A preferred embodiment of the invention thus provides ways and means for inhibiting any looseness between the releasably retained hollow-cylindrical member 11 and the hub 16 after engagement with the inside of such hollow-cylindrical member and continuously during rotation of the hub; with the term "rotation" for present purposes also including rapid rotation reversals. In particular, the inhibiting means according to the illustrated preferred embodiment include compression springs 41 to 43 backed by retainer segments 33 to 35 for urging the locking keys 17 to 19 further up their ramps and their shaped top portions further into the reel slots 61 to 63 after engagement with the inside of the hollow-cylindrical member and continuously during rotation of the hub. Any pounding of the reel and damage of reel and mounting hub is thus avoided, in addition to a significant improvement of the quality of the recording and playback operations relative to the recording tape 57.

From a somewhat broader aspect thereof, the subject invention provides slots in the hollow-cylindrical member or reel core 11 at the inside thereof. Locking members 17 to 19 for entering corresponding slots 61 to 63 at the inside of the hollow-cylindrical member 11 are provided on the hub 16. After the hollow cylindrical member 11 or reel 12 has been placed onto the hub, the locking members 17 to 19 are driven into the slots 61 to 63 for secure retention of the reel on its mounting hub.

As indicated above, the locking members 17 to 19 preferably are continuously urged into the slots 61 to 63 during rotation of the hub 16 and reel 12.

The slots 61 to 63 preferably are arranged in parallel to an axis of the hub, such as to the hub axis of rotation, as seen in the drawings. The locking members 17 to 19 are arranged in parallel to the slots 61 to 63 and preferably are arranged at least partially conextensively with these slots. As in the other embodiment, the compression springs 41 to 43, or equivalent biasing means continuously urge the locking members 17 to 19 into the slots 61 to 63 during rotation of the hub.

According to the illustrated preferred embodiment, and as seen from the drawings, each wedge-shaped member or locking key 17 to 19 is tapered in parallel to its corresponding ramp. In practice, each member 17 to 19 preferably is tapered also transversely to its corresponding ramp, as best seen in FIG. 3.

Each ramp 21 to 23 preferably is provided with a V-shaped groove extending in an axial direction of the hub. The expression "axial direction" in this context includes a direction which lies in a plane extending along the axis of rotation of the hub. Each wedge-shaped member or locking key 17 to 19 is accommodated in the V-shaped groove of its corresponding ramp. In particular, each member 17 to 19 may be provided with a V-shaped bottom slidable in the V-shaped groove of its corresponding ramp.

Figure 2:
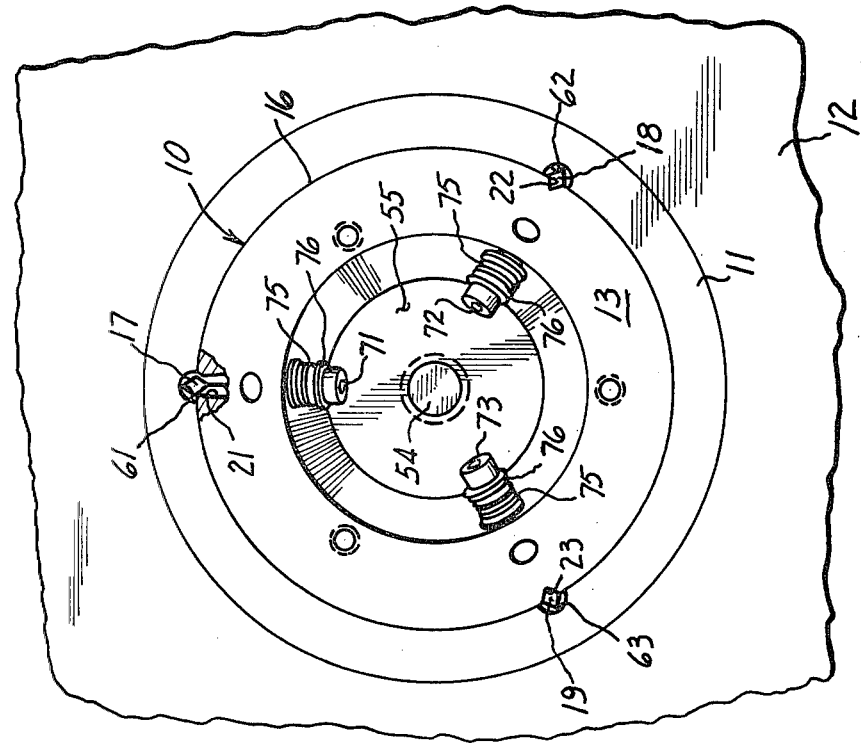
FIG. 2 is a view taken along the line 2—2 in FIG. 1.

As seen in FIGS. 2 and 3, and in accordance with the best mode currently contemplated for carrying the subject invention into effect, each wedge-shaped member or locking key 17 to 19 is provided with a tapering rhomboid or diamond-shaped cross-section defining two sides slidable in the V-shaped groove of its corresponding ramp and two top sides shaped for entry into the reel slots 61 to 63. The diamond or rhomboid shape of the locking keys 17 to 19 thus assures positive contact with the reel slots.

Preparatory of a removal of the reel 12 from its mounting hub 16, the knob 26 is rotated in an opposite sense, whereby the retainer segments 33 to 35 engage the washers at the free ends of the pins 26, and, upon further rotation of the knob 26, positively pull the locking members 17 to 19 out of contact with the reel core 11 and out of the reel slots 61 to 63. This positive withdrawal of the locking keys or members assures that the reel 12 can be removed by supplying the necessary force to break it loose from its tightened condition. At the same time, the rotating cam withdraws the reel hold down clamp 45 inwardly, so that the reel may now easily be slid from its mounting hub.

In the illustrated preferred embodiment, the locking keys 17 to 19 are resiliently retained on their ramps 21 to 23 by screws 71 to 73 threaded into transverse bores 74 in the locking keys, and Belleville springs 75 retained between washers 76 and 77 on the shaft of screws 71 to 73. In particular, a resilient assembly 75 to 77 is located and acts on each screw 71, 72 or 73 and on a corresponding key hold down member 78 that slides in a groove or slot 79 extending in parallel to the corresponding ramp 21, 22 or 23. Slots 81 and 82 are provided in parallel to the groove 79 to provide sufficient clearance for each screw 71, 72 and 73 and each spring assembly 75 to 77 for effective movement of each locking key up and down its corresponding ramp.

The subject invention meets all of its initially stated objectives. Also, the present extensive disclosure suggests and renders apparent to those skilled in the art various modifications and variations within the spirit and scope of the invention.

I claim:

1. A method of releasably retaining a hollow-cylindrical member on a rotatable hub against forces tending to loosen said member, comprising in combination the steps of:
    providing a wedge-shaped member for engaging said hollow-cylindrical member on the inside thereof;
    providing said hub with a ramp for said wedge-shaped member;
    placing said hollow-cyindrical member on said hub;
    driving said wedge-shaped member up said ramp into engagement with the inside of said hollow-cylindrical member; and
    inhibiting any looseness between said releasably retained hollow-cylindrical member and the hub by urging said wedge-shaped member further up said ramp after engagement with the inside of said hollow-cylindrical member and continuously during rotation of said hub.

2. A method as claimed in claim 1, including the step of:
    tapering said wedge-shaped member in parallel to said ramp.

3. A method as claimed in claim 1, including the step of:
tapering said wedge-shaped member in parallel to said ramp and also transversely to said ramp.

4. A method as claimed in claim 1, including the steps of:
providing said ramp with a V-shaped groove extending in an axial direction of said hub; and
accommodating said wedge-shaped member in said V-shaped groove.

5. A method as claimed in claim 1, including the steps of:
providing said ramp with a V-shaped groove extending in an axial direction of said hub; and
providing said wedge-shaped member with a V-shaped bottom slidable in said V-shaped groove.

6. A method as claimed in claim 1, including the steps of:
providing said ramp with a V-shaped groove extending in an axial direction of said hub; and
providing said wedge-shaped member with a tapering rhomboid cross-section defining two sides slidable in said V-shaped groove.

7. A method as claimed in claim 1, 2, 3, 4, 5 or 6, including the step of:
pulling said wedge-shaped member out of engagement with said hollow-cylindrical member preparatory to a release of said hollow-cylindrical member from the hub.

8. A method as claimed in claim 1, 2, 3, 4, 5 or 6, including the step of:
releasably clamping said hollow-cylindrical member on the hub.

9. A method of releasably retaining a hollow-cylindrical member on a rotatable hub against forces tending to loosen said member, comprising in combination the steps of:
providing three wedge-shaped members for engaging said hollow-cylindrical member on the inside thereof;
providing said hub with three circumferentially distributed ramps for said wedge-shaped member;
accommodating said three wedge-shaped members on said three ramps;
placing said hollow-cylindrical member on said hub;
driving said wedge-shaped members up said ramps into engagement with the inside of said hollow-cylindrical member; and
inhibiting any looseness between said releasably retained hollow-cylindrical member and the hub by urging said wedge-shaped members further up said ramps after engagement with the inside of said hollow-cylindrical member and continuously during rotation of said hub.

10. A method as claimed in claim 9, including the step of:
tapering each wedge-shaped member in parallel to its corresponding ramp.

11. A method as claimed in claim 9, including the step of:
tapering each wedge-shaped member in parallel, and also transversely to its corresponding ramp.

12. A method as claimed in claim 9, including the steps of:
providing each ramp with a V-shaped groove extending in an axial direction of said hub; and
accommodating each wedge-shaped member in the V-shaped groove of its corresponding ramp.

13. A method as claimed in claim 9, including the steps of:
providing each ramp with a V-shaped groove extending in an axial direction of said hub; and
providing each wedge-shaped member with a V-shaped bottom slidable in the V-shaped groove of its corresponding ramp.

14. A method as claimed in claim 9, including the steps of:
providing each ramp with a V-shaped groove extending in an axial direction of said hub; and
providing each wedge-shaped member with a tapering rhomboid cross-section defining two sides slidable in the V-shaped groove of its corresponding ramp.

15. A method as claimed in claim 9, 10, 11, 12, 13 or 14, including the step of:
pulling each wedge-shaped member out of engagement with said hollow-cylindrical member preparatory to a release of said hollow-cylindrical member from the hub.

16. A method as claimed in claim 9, 10, 10, 11, 12, 13 or 14, including the step of:
providing a common means for jointly actuating said wedge-shaped members on said ramps.

17. A method as claimed in claim 9, 10, 11, 12, 13 or 14, including the step of:
releasably clamping said hollow-cylindrical member on the hub.

18. A method as claimed in claim 9, 10, 11, 12, 13 or 14, wherein:
said hollow-cylindrical member is provided at the inside thereof with three slots corresponding to said three wedge-shaped members;
said driving includes the step of driving said wedge-shaped members partially into said slots; and
said inhibiting includes the step of continuously urging said wedge-shaped members further into said slots during rotation of said hub.

19. A method of releasably retaining a hollow-cylindrical member on a rotatable hub against forces tending to loosen said member, comprising in combination the steps of:
providing a slot in said hollow-cylindrical member at the inside thereof;
providing a locking key for engaging said hollow-cylindrical member at said slot;
providing said hub with a ramp for said locking key;
placing said hollow-cylindrical member on said hub; and
driving said locking key up said ramp into engagement with said hollow-cylindrical member at said slot.

20. A method as claimed in claim 19, including the step of:
inhibiting any looseness between said releasably retained hollow-cylindrical member and the hub by urging said locking key further up said ramp after engagement with the inside of said hollow-cylindrical member and continuously during rotation of said hub.

21. A method as claimed in claim 19, including the step of:
tapering said locking key in parallel to said ramp and also transversely to said ramp.

22. A method as claimed in claim 19, including the steps of:

providing said ramp with a V-shaped groove extending in an axial direction of said hub; and
accommodating said locking key in said V-shaped groove.

23. A method as claimed in claim 19, including the steps of:
providing said ramp with a V-shaped groove extending in an axial direction of said hub; and
providing said locking key with a V-shaped bottom slidable in said V-shaped groove.

24. A method as claimed in claim 19, including the steps of:
providing said ramp with a V-shaped groove extending in an axial direction of said hub; and
providing said locking key with a tapering rhomboid cross-section defining two sides slidable in said V-shaped groove.

25. A method as claimed in claim 19, 20, 21, 22, 23 or 24, including the step of:
pulling said locking key out of engagement with said hollow-cylindrical member preparatory to a release of said hollow-cylindrical member from the hub.

26. A method as claimed in claim 19, 20, 21, 22, 23 or 24, including the step of:
releasably clamping said hollow-cylindrical member on the hub.

27. A method of releasably retaining a hollow-cylindrical member on a rotatable hub against forces tending to loosen said member, comprising in combination the steps of:
providing slots in said hollow-cylindrical member at the inside thereof;
providing locking members for engaging said hollow-cylindrical member at said slots;
placing said hollow-cylindrical member on said hub; and
driving said locking members into said slots.

28. A method as claimed in claim 27, including the step of:
continuously urging said locking members into said slots during rotation of said hub.

29. A method as claimed in claim 27 or 28, wherein: said locking members are arranged in parallel to said slots.

30. A method as claimed in claim 27 or 28, wherein:
said slots are arranged in parallel to an axis of said hub; and
said locking members are arranged at least partially coextensively with said slots.

31. Apparatus for releasably retaining a hollow-cylindrical member on a rotatable hub against forces tending to loosen said member, comprising in combination:
a wedge-shaped member for engaging said hollow-cylindrical member on the inside thereof;
a ramp on said hub for said wedge-shaped member;
means coupled to said wedge-shaped member for driving said wedge-shaped member up said ramp into engagement with the inside of said hollow-cylindrical member; and
means for inhibiting any looseness between said releasably retained hollow-cylindrical member and the hub after engagement with the inside of said hollow-cylindrical member and continuously during rotation of said hub, said inhibiting means including means coupled to said wedge-shaped member for urging the wedge-shaped member further up said ramp after engagement with the inside of said hollow-cylindrical member and continuously during rotation of said hub.

32. Apparatus as claimed in claim 31, wherein:
said urging means include spring means coupled to the wedge-shaped member for biasing the wedge-shaped member further up said ramp.

33. Apparatus as claimed in claim 31, wherein:
said wedge-shaped member is tapered in parallel to said ramp.

34. Apparatus as claimed in claim 31, wherein:
said wedge-shaped member is tapered in parallel to said ramp and also transversely to said ramp.

35. Apparatus as claimed in claim 31, wherein:
said ramp includes a V-shaped groove extending in an axial direction of said hub; and
said wedge-shaped member has a configuration corresponding to said V-shaped groove.

36. Apparatus as claimed in claim 31, wherein:
said ramp includes a V-shaped groove extending in an axial direction of said hub; and p1 said wedge-shaped member has a V-shaped bottom slidable in said V-shaped groove.

37. Apparatus as claimed in claim 31, wherein:
said ramp includes a V-shaped groove extending in an axial direction of said hub; and
said wedge-shaped member has a tapering rhomboid cross-section defining two sides slidable in said V-shaped groove.

38. Apparatus as claimed in claim 31, 32, 33, 34, 35, 36 or 37, including:
means coupled to said wedge-shaped member for pulling said wedge-shaped member out of engagement with said hollow-cylindrical member preparatory to a release of said hollow-cylindrical member from the hub.

39. Apparatus as claimed in claim 31, 32, 33, 34, 35, 36 or 37, including:
means in said hub for releasably clamping said hollow-cylindrical member on the hub.

40. Apparatus for releasably retaining a hollow-cylindrical member on a rotatable hub against forces tending to loosen said member, comprising in combination:
three wedge-shaped members for engaging said hollow-cylindrical member on the inside thereof;
three circumferentially distributed ramps on said hub for individually accommodating said wedge-shaped members;
means coupled to said wedge-shaped members for driving said wedge-shaped members up said ramps into engagement with the inside of said hollow-cylindrical member; and
means for inhibiting any looseness between said releasably retained hollow-cylindrical member and the hub after engagement with the inside of said hollow-cylindrical member and continuously during rotation of said hub, said inhibiting means including means coupled to said wedge-shaped members for urging the wedge-shaped members further up said ramps after engagement with the inside of said hollow-cylindrical member and continuously during rotation of said hub.

41. Apparatus as claimed in claim 40, wherein:
said urging means include spring means coupled to said wedge-shaped members for biasing said wedge-shaped members further up said ramp.

42. Apparatus as claimed in claim 40, wherein:
each wedge-shaped member is tapered in parallel to its corresponding ramp.

43. Apparatus as claimed in claim 40, wherein:

each wedge-shaped member is tapered in parallel, and also transversely, to its corresponding ramp.

44. Apparatus as claimed in claim 40, wherein:

each ramp includes a V-shaped groove extending in an axial direction of said hub; and each wedge-shaped member has a configuration corresponding to said V-shaped groove.

45. Apparatus as claimed in claim 40, wherein:

each ramp includes a V-shaped groove extending in an axial direction of said hub; and each wedge-shaped member has a V-shaped bottom slidable in said V-shaped groove.

46. Apparatus as claimed in claim 36, wherein:

each ramp includes a V-shaped groove extending in an axial direction of said hub; and each wedge-shaped member has a tapering rhomboid cross-section defining two sides slidable in said V-shaped groove.

47. Apparatus as claimed in claim 40, 41, 42, 43, 44, 45, 46, including:

means coupled to said wedge-shaped member for pulling said wedge-shaped member out of engagement with said hollow-cylindrical member preparatory to a release of said hollow-cylindrical member from the hub.

48. Apparatus as claimed in claim 41, 42, 43, 44, 45, 46 or 47, including:

common means for said three wedge-shaped members for jointly actuating said wedge-shaped members on said ramps.

49. Apparatus as claimed in claim 40, 41, 42, 43, 44, 45 or 46, including:

means in said hub for releasably clamping said hollow-cylindrical member on the hub.

50. Apparatus as claimed in claim 40, 41, 42, 43, 44, 45 or 46, wherein:

said driving means include means for driving said wedge-shaped members partially into corresponding slots at the inside of said hollow-cylindrical member; and said inhibiting means include means for continuously urging said wedge-shaped members further into said slots during rotation of said hub.

51. Apparatus for releasably retaining a hollow-cylindrical member on a rotatable hub against forces tending to loosen said member, comprising in combination:

a locking key for engaging said hollow-cylindrical member at a slot on the inside thereof, said locking key having a portion shaped for entry into said slot;

a ramp on said hub for said locking key; and means coupled to said locking key for driving said locking key up said ramp into engagement with the inside of said hollow-cylindrical member and said shaped portion into said slot.

52. Apparatus as claimed in claim 51, including:

means for inhibiting any looseness between said releasably retained hollow-cylindrical member and the hub after engagement with the inside of said hollow-cylindrical member and continuously during rotation of said hub, said inhibiting means including means coupled to said locking keys for urging the locking keys further up said ramp and said shaped portion further into said slot after engagement with the inside of said hollow-cylindrical member and continuously during rotation of said hub.

53. Apparatus as claimed in claim 52, wherein:

said urging means include spring means coupled to said locking keys for biasing said locking keys further up said ramp.

54. Apparatus as claimed in claim 51, wherein:

each locking key is tapered in parallel to its corresponding ramp.

55. Apparatus as claimed in claim 51, wherein:

each locking key is tapered in parallel, and also transversely, to its corresponding ramp.

56. Apparatus as claimed in claim 51, wherein:

each ramp includes a V-shaped groove extending in an axial direction of said hub; and each locking key has a configuration corresponding to said V-shaped groove.

57. Apparatus as claimed in claim 51, wherein:

each ramp includes a V-shaped groove extending in an axial direction of said hub; and each locking key has a V-shaped bottom slidable in said V-shaped groove.

58. Apparatus as claimed in claim 51, wherein:

each ramp includes a V-shaped groove extending in an axial direction of said hub; and each locking key has a tapering rhomboid cross-section defining two sides slidable in said V-shaped groove.

59. Apparatus as claimed in claim 51, 52, 53, 54, 55, 56 or 57, including:

means coupled to said locking key for pulling said locking key out of engagement with said hollow-cylindrical member preparatory to a release of said hollow-cylindrical member from the hub.

60. Apparatus as claimed in claim 51, 52, 53, 54, 55, 56 or 57, including:

means in said hub for releasably clamping said hollow-cylindrical member on the hub.

61. Apparatus for releasably retaining a hollow-cylindrical member on a rotatable hub against forces tending to loosen said member, comprising in combination:

locking members for entering corresponding slots at the inside of said hollow-cylindrical member on said hub; and means coupled to said locking members for driving said locking members into said slots.

62. Apparatus as claimed in claim 61, including:

means coupled to said locking members for continuously urging said locking members into said slots during rotation of said hub.

63. Apparatus as claimed in claim 61, wherein:

said urging means include springs for biasing said locking members into said slots.

64. Apparatus as claimed in claim 61, 62 or 63, wherein:

said locking members extend in parallel to said slots.

65. Apparatus as claimed in claim 61, 62 or 63, wherein:

said slots are parallel to an axis of said hub; and said locking members are at least partially coextensive with said slots.

* * * * *